United States Patent
Ward

(10) Patent No.: US 6,403,726 B1
(45) Date of Patent: Jun. 11, 2002

(54) WATER SOLUBLE POLYMER CONTAINING DITHIOCARBAMATE FUNCTIONALITIES

(75) Inventor: William J. Ward, Glen Ellyn, IL (US)

(73) Assignee: Nalco Chemical Company, Naperville, IL (US)

( * ) Notice: Subject to any disclaimer, the term of this patent is extended or adjusted under 35 U.S.C. 154(b) by 49 days.

(21) Appl. No.: 09/638,434

(22) Filed: Aug. 14, 2000

Related U.S. Application Data

(62) Division of application No. 09/232,485, filed on Jan. 15, 1999.

(51) Int. Cl.$^7$ .................................................. C08F 8/34
(52) U.S. Cl. ..................................... 525/328.3; 525/343
(58) Field of Search ............................... 525/328.3, 343

(56) References Cited

U.S. PATENT DOCUMENTS

| | | |
|---|---|---|
| 4,551,506 A | 11/1985 | Gosselink |
| 4,670,160 A | 6/1987 | Moriya et al. |
| 4,690,765 A | 9/1987 | Linder et al. |
| 5,047,083 A | 9/1991 | Blake et al. |
| 5,143,624 A | 9/1992 | Morse |
| 5,164,095 A | 11/1992 | Sparapany et al. |
| 5,346,627 A | 9/1994 | Siefert et al. |
| 5,387,365 A | 2/1995 | Moriya et al. |
| 5,401,420 A | 3/1995 | Siefert et al. |
| 5,464,605 A | 11/1995 | Hayden |
| 5,500,133 A | 3/1996 | Carey et al. |
| 5,510,040 A | 4/1996 | Miller et al. ............... 210/721 |
| 5,554,298 A | 9/1996 | Kochik et al. |
| 5,766,478 A | 6/1998 | Smith et al. ............... 210/638 |

FOREIGN PATENT DOCUMENTS

| EP | 0 581 164 A1 | 2/1994 |
|---|---|---|
| WO | WO 98/23538 | 6/1998 |

OTHER PUBLICATIONS

Separation Science and Technology, pp. 1587–1605, 1990; "Treatment of Waste Water from Wet Lime (Stone) Flue Gas Desulfurization Plants with Aid of Crossflow Microfiltration", G.D. Enoch, W. Spiering, P. Tigchelaar, J. de Niet and J.B. Lefers.

American Water Works Association Research Foundation, Lyonnaise des Eaux and Water Research Commission of South Africa, pp. 16.1–16.12, 1996; "Coagulation and Membrane Separation", Mark R. Weisner and Jean–Michel Laîné.

The 1997 Jubilee Research Event, IchemE, pp. 1061–1064, "Crossflow Microfiltration of Concentrated Titania Suspensions", J.Q. Marchant and R.J. Wakeman.

"Improvements in Membrane Microfiltration Using Coagulation Pretreatment", pp. 281–296, M.R. Wiesner, S. Veerapaneni and D. Brejchová.

The 1997 Jubilee Research Event, IchemE, pp. 635–638, "Removal of Divalent Metal Mixtures from Water by Yeast Using Crossflow Microfiltration", Y.K. Bayhan, B. Keskinler, A. Cakici and G. Akay.

Separation Science and Technology, pp. 1831–1842, 1996; "Removal of Metal Ions from Liquid Solutions by Crossflow Microfiltration", Dong–Jang Chang and Shyh–Jye Hwang.

Elsevier Science Publishers B.V., pp. 247–262, 1993; "Selective Removal of Metal Ions from Ground Water by Polymeric Binding and Microfiltration", K. Volchek, L. Keller, D. Velicogna and H. Whittaker.

*Primary Examiner*—Bernard Lipman
(74) *Attorney, Agent, or Firm*—Margaret M. Brumm; Thomas M. Breininger

(57) ABSTRACT

The simultaneous precipitation of soluble heavy metal ions from semiconductor wastewater containing abrasive solids and enhancement of microfilter operation is achieved through the addition of an effective amount of a water-soluble polymer containing dithiocarbamate functionalities to the wastewater.

3 Claims, No Drawings

WATER SOLUBLE POLYMER CONTAINING DITHIOCARBAMATE FUNCTIONALITIES

CROSS-REFERENCE TO RELATED PATENT APPLICATIONS

This patent application is a divisional of U.S. patent application Ser. No. 09/232,485, filed Jan. 15, 1999, now pending.

FIELD OF THE INVENTION

This invention relates generally to wastewater treatment and, more particularly, to a composition and method for simultaneously precipitating metal ions from semiconductor wastewater and enhancing microfilter operation.

BACKGROUND OF THE INVENTION

Until the development of copper interconnect technology, copper was not found in wastewater from the production of multilayer microchips by the semiconductor industry. Copper is now being used as a replacement for aluminum and tungsten because of its lower electrical resistivity. In the process of manufacturing multilayer chips, there are many steps including the deposition of the dielectric layer (silicon dioxide or low-k polymeric), etching the interconnect pattern (trenches and vias) into the dielectric layer, deposition of copper metal into the trenches and vias, and chemical mechanical polishing (CMP) to remove excess copper and create a level surface prior to creation of the next layer of the chip. The CMP step is accomplished by the use of polishing pads and proprietary polishing slurries which contain abrasive solids such as alumina, oxidants such as peroxide, chelants such as citrate, and other additives such as corrosion inhibitors. Therefore, the resulting wastewater contains chelated copper, oxidants, additives and abrasive solids. The presence of the abrasive solids at concentrations of 200–5000 mg/L makes this wastewater different than the typical metal-containing wastewater from electroplating operations.

Wastewater, from the metal-CMP step of microchip manufacture, can vary widely depending on the original slurry composition and the CMP tool design and operating parameters. The slurry is diluted by rinse water during polishing. The amount of rinse water used determines metal and abrasive solids levels in the wastewater.

Several polymer chemistries have been used to treat wastewater containing transition metal complexes, such as copper-ethylenediaminetetraacetic acid (EDTA), resulting in the precipitation of the metal-polymer solids. These polymer chemistries contain an amine functionality that can be reacted with carbon disulfide to form dithiocarbamate (DTC) functionalities on a polymer backbone. One such polymer is a carbon disulfide modified ethylenedichloride-ammonia condensation polymer, as described in U.S. Pat. No. 5,164,095. The polymer disclosed in the '095 patent is a low molecular weight, highly branched material. Other polymer backbones suitable for modification with carbon disulfide include the polyethylenimine (PEI) polymer described in U.S. Pat. No. 5,387,365, the epichlorohydrin and multifunctional amine condensation polymer disclosed in U.S. Pat. Nos. 4,670,160 and 5,500,133 and the polyallylamine polymer taught in EP 0 581 164 Al. Despite these known polymer chemistries, however, there is still a need for new polymers containing DTC functionalities which effectively treat wastewater and possess other desirable attributes such as low levels of product impurities (e.g., sodium sulfide, which is toxic and foul smelling), relative ease of manufacture (e.g., to avoid the gaseous ammonia in ethylenedichloride and azeridine in PEI) and improved solids/liquid separation characteristics.

U.S. Pat. No. 5,346,627 describes the use of polymers containing DTC functionalities for the treatment of soluble metals and subsequent removal of precipitated solids in a filtering device, including a microfilter. However, the '627 patent does not describe the use of such polymers for simultaneously precipitating metal ions from semiconductor wastewater and enhancing microfilter operation.

There are two parameters of concern during microfilter operation. One is flux which is defined as the flow of purified water divided by the membrane area. In microfiltration, one way of expressing this is as gallons of pure water per square foot of membrane area per day or GFD. Another way of expressing this is permeability, which is flux divided by trans membrane pressure (TMP). Permeability is essentially "normalized" flux which takes into account changes in system pressures. Both flux and permeability are used to describe the passage of water through the membrane, however, they are not interchangeable. The other parameter of concern is solids passage. Generally speaking, the purpose of the microfilter is to separate solids from liquids in a bulk solution. Because the microfilter has a distinct cutoff size (ranging from approximately 0.1 to 5.0 microns depending on method of manufacture), only particles larger than the cutoff are retained, in theory. However, as is the case with all membrane processes, a percentage of the total solids will pass through the membrane. Therefore, as the initial concentration of the feed water increases, so too will the absolute value of the solids content of the permeate water. The percentage of materials which pass through the filter, however, remains largely the same unless membrane damage has occurred.

In many operations, microfiltration is used to perform the functions of a clarifier and a media filter. This is because it has a small footprint and performs these operations more quickly than conventional technology. It is important, therefore, to keep the microfilter in good operating condition. A major problem with microfiltration is that the filters can become fouled or plugged with fine solids. This causes the flux to decrease in the unit, and it must be taken off line to be cleaned. Microfilter operation can be enhanced by using additives which result in higher flux values and longer times between occurrences of fouling. Flux enhancement is desirable because it decreases the amount of time during which the equipment is out of service, thereby increasing its overall efficiency.

Accordingly, it would be desirable to provide a new water-soluble polymer containing DTC functionalities which effectively treats metals-contaminated wastewater and possesses other desirable properties, such as a low level of product impurities, relative ease of manufacture and improved solids/liquid separation characteristics. It would also be desirable to provide a method for the use of such a polymer to simultaneously precipitate soluble heavy metal ions from semiconductor wastewater containing abrasive solids and enhance microfilter operation.

SUMMARY OF THE INVENTION

The present invention is directed to a new water-soluble polymer containing DTC functionalities and the use of such a polymer in a method for simultaneously precipitating soluble heavy metal ions from semiconductor wastewater containing abrasive solids and enhancing the operation of a microfilter.

The new water-soluble polymer containing DTC functionalities effectively treats semiconductor wastewater, contains a low level of product impurities, can be relatively easily manufactured and exhibits improved solids/liquid separation characteristics. When an effective amount of this or a similar polymer containing DTC functionalities is added to semiconductor wastewater, the simultaneous precipitation of soluble heavy metal ions from the wastewater and enhancement of microfilter operation is achieved.

DETAILED DESCRIPTION OF THE INVENTION

The present invention is directed to a composition and method for simultaneously precipitating soluble heavy metal ions from semiconductor wastewater containing abrasive solids and enhancing the operation of a microfilter.

The composition of the present invention is a water-soluble polymer which contains DTC functionalities and has the formula:

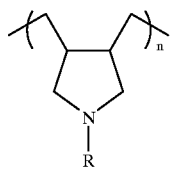

wherein R is H or $CS^-_2X^+$ and $X^+$ is an alkali metal (such as sodium or potassium), an alkaline earth metal or ammonium, and n is the number of repeating units such that the polymer has a total molecular weight in the range of from about 3000 to about 100,000.

The new composition is prepared by polymerizing diallylamine and then subsequently reacting it with $CS_2$ to form DTC functionalities on the polymer backbone. The diallylamine may also be copolymerized with suitable monomers. For example, the suitable monomers may have an anionic, cationic or neutral charge and may include acrylate, acrylamide or vinyl containing monomers. The synthesis is shown below:

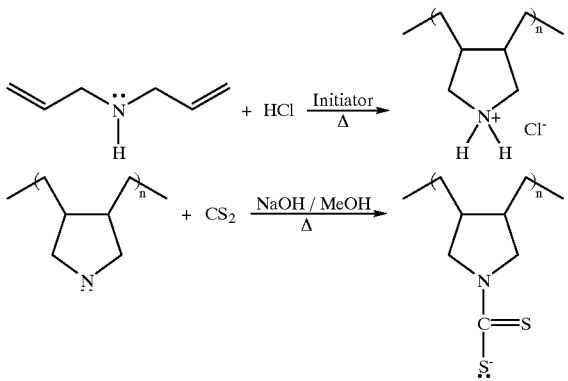

The amount of DTC functionalization (i.e., the percent of R as $CS^-_2X^+$) on the polymer can be controlled and should be at least about 5%, and preferably from about 20 to about 70%. The resulting water-soluble polymer containing DTC functionalities is more linear, i.e., less branched, than other known DTC-polymers using a polyethylenimine type backbone and contains a cyclic amine. Also, the inventive polymer contains only secondary amine groups in the polymer backbone, precluding the formation of unstable sodium dithiocarbamates and the subsequent degradation to sodium sulfide.

In accordance with the method of the present invention, either the new or a known water-soluble polymer containing DTC functionalities is used to simultaneously precipitate soluble heavy metal ions from semiconductor wastewater containing abrasive solids and enhance the operation of a microfilter.

The water-soluble polymer contains DTC functionalities and has the formula: $R'_2N$—R wherein R' is an alkyl group, aryl group or substituted derivative thereof and R is H or $CS^-_2X^+$ and $X^+$ is an alkali metal (such as sodium or potassium), an alkaline earth metal or ammonium. One skilled in the art would recognize that $R'_2N$—R is a repeating unit in the polymer. The water-soluble polymers which may be used in the practice of this invention preferably include the dithiocarbamate derivatives of polydiallylamine, polyethylenimine and the epichlorohydrin and multifunctional amine condensation polymer of U.S. Pat. No. 5,387,365, the disclosure of which is incorporated herein by reference. As used herein, "polyethyleneimine" is meant to include the condensation polymer prepared from ethylenedichloride and ammonia. Any suitable polymer containing primary or secondary amine groups which can be modified to form dithiocarbamate functionalities may also be used in the practice of the present invention.

The soluble heavy metal ions which may be precipitated from the semiconductor wastewater include copper, nickel, zinc, lead, mercury, cadmium, silver, iron, manganese and mixtures thereof.

The abrasive solids which may be present in the semiconductor wastewater include alumina, silica, ceria, germania, titania, zirconia and mixtures thereof.

Oxidants may also be present in the semiconductor wastewater. These oxidants include potassium iodate, potassium ferricyanide, hydrogen peroxide, ferric nitrate, silver nitrate, nitric acid, sulfuric acid, potassium hypochlorite, potassium permanganate, ammonium persulfate, ammonium peroxydisulfate, peracetic acid, periodic acid, peroxymonosulfuric acid, potassium peroxomonosulfate, peroxymonosulfate, malonamide, urea-hydrogen peroxide, potassium dichromate, potassium bromate, vanadium trioxide, oxygenated water, ozonated water and mixtures thereof.

Although it is not a requirement of the present invention, the oxidants may optionally be removed from the wastewater. Ways to remove these oxidants are generally known to those skilled in the art (See e.g., U.S. Pat. No. 5,464,605). However, if the oxidants are not removed from the wastewater or if any oxidants remain, they may be reduced by the method of the present invention.

The water-soluble polymer containing DTC functionalities is dosed at an amount which will effectively precipitate soluble heavy metal ions from semiconductor wastewater containing abrasive solids and simultaneously enhance microfilter operation. It is preferred that the DTC-polymer be added to the wastewater in at least an amount effective for precipitating the heavy metal ions from the wastewater. The addition of such an effective amount will simultaneously enhance microfilter operation. An amount greater than the metal precipitating amount can be added to the wastewater if it is desirable to further increase the flux of permeate through the microfilter. The adjustment of dosage can be made manually by one skilled in the art of microfilter operation or automatically by the use of polymer-specific sensors.

The DTC-polymer can be added to the semiconductor wastewater by any conventional method, preferably before the microfilter. Also, prior to the addition of the DTC-polymer to the semiconductor wastewater, the pH of the wastewater may preferably be adjusted to between 4 and 12. More preferably, the pH may be adjusted to between 6 and 10, with between 7 and 9 being most preferred.

The types of microfilters suitable for use in the practice of the present invention are generally known to those skilled in the art. Such microfilters include ceramic membrane and synthetic membrane units, such as the U.S. Filter Membralox® and the U.S. Filter Memtek units, respectively. It is preferred that the microfilter have a molecular cutoff size in the range of about 0.1 to about 5 microns and, more preferably, in the range of about 0.1 to about 1 micron.

The present inventors have discovered a new water-soluble polymer containing DTC functionalities which effectively treats semiconductor wastewater, contains a low level of product impurities, can be relatively easily manufactured and exhibits improved solids/liquid separation characteristics. Moreover, it has been discovered that when an effective amount of the inventive or a similar polymer containing DTC functionalities is added to semiconductor wastewater, the simultaneous precipitation of soluble heavy metal ions from the wastewater and enhancement of microfilter operation is achieved. This is surprising because polymers containing DTC functionalities are negatively charged at the treatment pH and cationic polymers are typically used in such applications for flux enhancement. (See *Water Treatment Membrane Processes*, American Water Works Association Research Foundation, Lyonnaise des Eaux, Water Research Commission of South Africa, McGraw-Hill, 1996, Chap. 16, Coagulation and Membrane Separation.)

The use of small molecule precipitant sodium dimethyldithiocarbamate (DMDTC) with cationic coagulants is known to those skilled in the art for metal ion precipitation and removal from wastewater using a microfilter device. In that case, however, separate determinations of appropriate dosage must be made for the coagulant and the precipitant due to changing levels of dispersancy and metals loading. While coagulant products may improve flux, the consistency of such performance will be poor, i.e., there will be episodes of diminished permeate flux and quality. The advantage to using polymers containing DTC functionalities is the enhanced performance of membrane units relative to permeate flux and permeate quality, as well as the consistency of such performance with changing wastewater composition. Also, the quantity of chemical used and, ultimately, chemical sludge produced, will be greatly diminished with the DTC-polymer relative to DMDTC and coagulant.

EXAMPLES

The following examples are intended to be illustrative of the present invention and to teach one of ordinary skill how to make and use the invention. These examples are not intended to limit the invention or its protection in any way.

Example 1

Preparation of Polydiallylaminedithiocarbamate (Poly (DAADTC))

24.25 g of concentrated aqueous HCl were added to 24.25 g of cooled diallylamine. The mixture was pH adjusted to 0.6, and 11.62 g of water and 0.25 mL of formic acid were added. The solution was stirred and purged with nitrogen, then warmed to 80° C. An initiator solution comprised of 3.71 g of sodium persulfate and 5.7 g of deionized water was prepared and added continuously over a 1 hour period using a syringe pump. Approximately 5 minutes after the reaction began, the solution started to exotherm and was allowed to reflux (106° C.). The exotherm began to diminish after ½ hour. Following the completion of the initiator addition, the reaction was heated at 80° C. for another hour and then cooled. 10.3 g of water and a few drops of NaOH to adjust the pH to 7.5 were added to the cooled mixture. The final polydiallylamine product was a golden color and had a viscosity of 80 cps. The theoretical polymer solids (as free amine) was 30%.

The following method was used to prepare a poly (DAADTC) compound, such that 50% of the amine groups were functionalized with $CS_2$: 25.0 g of the polydiallylamine product prepared above were mixed with 9.0 g of a 25% NaOH solution. 12.0 mL of methanol were then added to dissolve any insoluble polymer. An additional 6.2 g of 25% NaOH solution were subsequently added to the mixture, along with 1 drop of Dowfax™ 2A1 surfactant. The mixture was then placed in a reaction flask and warmed to 35° C. Next, 2.94 g of $CS_2$ were added to the reaction, in small increments via syringe, over a 1 hour period. During the course of the $CS_2$ addition, a small amount (a total of 5.7 g) of 25% NaOH was added in order to keep the solution homogeneous. After the $CS_2$ addition was complete, the solution temperature was raised to 45° C. and held, with stirring for 2 hours. The resulting clear, golden brown solution had a pH of 12.2, and a theoretical polymer solids value of 19% (as sodium salt).

Example 2

The following polymer product (8702-1) was prepared by using NALCO® 603, a higher molecular weight ethylenedichloride-ammonia condensation polymer (NALCO® 603 is commercially-available from Nalco Chemical Company) and modifying it so that it contained approximately 35% incorporation of DTC functionalities. The resulting product was essentially a higher molecular weight version of NALMET® 8702. (NALMET® 8702 is commercially-available from Nalco Chemical Company). A 150 mL sample of NALCO® 603 polymer was pH adjusted to 9.1 using 50% NaOH. 123.54 g of the pH-adjusted polymer were added to a flask equipped with a reflux condenser and magnetic stir bar. 35 mL of deionized (D.I.) water, 36.5 g of 50% NaOH and 0.24 g of Dowfax™ 2A1 surfactant were added next. The solution was warmed to 34° C. and 20.72 g of carbon disulfide were added via syringe in small increments over the period of 1 hour. After this addition was complete, the reaction temperature was raised to 45° C. and the mixture was stirred and heated for an additional 3 hours. The resulting clear, golden solution had a pH of 12.3 and a theoretical polymer solids value of 28% (as the sodium salt).

Example 3

The following polymer product (8702-2) was prepared by using NALCO® 634 (a slightly higher molecular weight version of NALCO® 603) and modifying it so that it contained approximately 35% incorporation of DTC functionalities (NALCO® 634 is commercially-available from Nalco Chemical Company). The resulting product was essentially a higher molecular weight version of NALMET® 8702. The molecular weight of 8702-2 was higher than the molecular weight of 8702-1. A 150 mL sample of NALCO® 634 polymer was pH adjusted to 9.0 using 50% NaOH. 100.0 g of the pH adjusted polymer were added to a flask equipped with a reflux condenser and magnetic stir bar. 23.9 mL of D.I. water, 27.35 g of 50% NaOH and 0.18 g of Dowfax™ 2A1 surfactant were added next. The solution was warmed to 34° C. and 15.54 g of carbon disulfide were added via syringe in small increments over the period of 1 hour. After this addition was complete, the reaction temperature was raised to 45° C. and the mixture was stirred and heated for an additional 3 hours. The resulting clear, golden solution had a pH of 12.3 and a theoretical polymer solids value of 27% (as the sodium salt).

General Experimental Conditions

In all of the microfilter experiments which follow (Examples 4–9), membrane flux in gal/ft²/day (GFD) or permeability in GFDB was used to compare performance data. Membrane permeability is defined as the flux (in GFD) divided by the transmembrane pressure (TMP) expressed in bar (B).

$$TMP = \frac{(P_{inlet} - P_{outlet})}{2} - P_{permeate}$$

At standard temperature, permeability ($P_0$) is expressed as:

$$P_0 = \frac{GFD}{TMP_{bar}}$$

Appropriate corrections must be made for operation under various temperatures. Wherever possible in the experiments, temperature was held constant or nearly constant to minimize the changes in flux due to temperature. Where tight control was not possible, corrections were made to account for temperature induced flux changes.

Ceramic Microfilter Procedure

A T1-70 bench top ceramic membrane Microfiltration Pilot Unit (U.S. Filter, Warrendale, Pa.) outfitted with a continuous backpulse device which applied a short backpulse at designated intervals was used in all of the following examples. The backpulse was set to operate approximately every 2 minutes and had a duration of 2–3 seconds. Unless otherwise stated, the microfilter was operated in a "continuous recirculation" mode. Four liters of feed solution were prepared freshly each day and pH adjusted to between 7.0 and 7.5 prior to adding treatment, unless otherwise specified. It was then combined with the treatment, stirred gently with a spatula to mix (about 30 seconds), pH adjusted if necessary and placed into the microfilter tank. Tests typically lasted for 4–8 hours. In the continuous recirculation mode, the concentrate and permeate streams were combined in the microfilter tank, giving a feed stock of consistent composition.

Typical slurry compositions used in wafer processing can contain abrasive particles ranging from 50 nm to as large as 300 nm in size. Based on a variety of samples seen in this research group, it was decided that the Nalco standard test solution would consist of 1000 ppm of 75 nm (0.075 $\mu$)colloidal $SiO_2$ particles (NALCO® 2329, 40% silica mixture). The solution was doped with copper ammonium citrate to yield final Cu concentrations of 0 to 10 ppm.

As can be seen in the following examples, in certain instances the concentration of the slurry solids, the identity of the slurry solids, the concentration of Cu and the pH of the standard mixture was changed.

The operating conditions of the microfilter were kept within the following parameters:

Temperature: 24° to 30° C.
$P_{inlet}$: 10–25 psig
$P_{outlet}$: 10–25 psig(TMP=0.6 to 1.7 bar)
Flow: 2.5 gpm Because experimental pressures and TMP varied widely during some experiments, all ceramic microfilter experimental results (flux) are reported in terms of temperature corrected permeability.

Ceramic Membrane Cleaning Procedure

The membrane was cleaned when the clean water permeability dropped below the 450–500 GFDB range. All clean water fluxes were obtained using Milli-Q™ purified water, as deionized water contained enough dissolved material to foul the ceramic membrane pores. Milli-Q™ water is 18 megaohm high purity water produced from tap water that has been deionized, treated with activated carbon, UV light and particle filtration.

The cleaning solution consisted of 2% NaOH and 1000 ppm bleach. The solution was heated to approximately 70° C. And recirculated through the membrane for approximately 1 hour. After cooling, the unit was drained and rinsed with the Milli-Q™ water.

The polymers shown below in Table 1 were used in the following examples.

TABLE 1

| Polymer Product | % CS₂ Incorporation | % Solids | Backbone Mol. Wt (DA) | IV |
| --- | --- | --- | --- | --- |
| NALMET ® 8702 | 35 | 30 | 500 to 10,000 | 0.06 |
| NALMET ® 1689 | 50 | 30 | 500 to 10,000 | 0.06 |
| 8702-1 | 35 | 27 | 100 to 20,000 | 0.16 |
| 8702-2 | 35 | 27 | 100 to 30,000 | 0.26 |
| Betz 1722-150 | 50–75 | 20–25 | 30,000 | (25 cps) |
| Poly(DAADTC) | 50 | 15–20 | | |

NALMET® 8702 and NALMET® 1689 (available from Nalco Chemical Company of Naperville, Ill.) and polymers 8702-1 and 8702-2 (prepared above in Examples 2 and 3, respectively) are all DTC-derivatives of polyethyleneimine from the condensation polymer prepared from ethylenedichloride and ammonia. Betz 1722-150 (available from BetzDearborn of Trevose, Pa.) is a DTC-derivative of polyethylenimine (PEI). The DTC-derivative of polydiallylamine (poly(DAADTC) was prepared above in Example 1.

Example 4

In a series of experiments, the flux through the membrane was monitored using the standard test solution. The solution was treated either with dimethyldithiocarbamate (DMDTC) or with a polymer derivatized to contain dithiocarbamate functionalities. DMDTC was included in the tests as a benchmark. All polymeric products were fed at a dosage of 200 ppm. Table 2 below summarizes the results for the various chemistries.

All of the polymeric products (except Betz 1722-150) showed increased flux (enhancement) relative to the untreated solution and relative to the solution treated with DMDTC. Products with higher percent $CS_2$ incorporation such as Betz 1722-150 and NALMET® 1689, performed less well in this matrix than others. Nevertheless, it is expected that these products will enhance flux through the microfilter under optimized conditions of metal concentration, solids concentration, pH, dosage, etc. Final copper concentrations were less than 1 ppm in all cases.

TABLE 2

|  | Untreated Solution (Blank) | Sodium DMDTC | NALMET® 8702 | 8702-1 | 8702-2 | Betz 1722-150 | NALMET® 1689 |
|---|---|---|---|---|---|---|---|
| Average Flux | 144.0 | 153.2 | 466.8 | 217.8 | 500.0 | 156.1 | 192.1 |
| Max Cu in Permeate | 2.4 | 0.1 | 0.3 | 0.1 | 0.8 | 0.2 | 0.0 |

Example 5

NALMET® 8702 was studied using the standard slurry solution (1000 ppm $SiO_2$, 10 ppm Cu). The product was fed at a dosage of 200 ppm. Performance was tested at pH values between 7 and 11. Table 3 below summarizes the results of the testing. Flux enhancement was good at pH 7 and 9 and poor at pH 11 (approaching the value of the untreated solution). Cu was <0.5 ppm in the permeate of all samples.

TABLE 3

|  | Untreated Solution (Blank) | NALMET® 8702 | | | | |
|---|---|---|---|---|---|---|
|  |  | pH = 7 | pH = 7 | pH = 9 | pH = 9 | pH = 11 |
| Average Flux | 144.0 | 466.8 | 430.1 | 400.0 | 576.8 | 168.1 |
| Max Cu Permeate | 2.4 | 0.06 |  | 0.33 |  | 0.3 |

Example 6

An experimental solution containing 2000 ppm $SiO_2$ and 10 ppm Cu was treated with various doses of NALMET® 8702. The theoretical amount of NALMET® 8702 needed for Cu removal under these conditions is 200 ppm (20:1 product/Cu ratio). As shown in Table 4, flux enhancement was noted at dosages less than required for Cu removal to less than 1 ppm Cu. Increasing the dosage resulted in increased flux enhancement up to about 500 ppm product. Above this concentration, no further performance enhancement was seen. At dosages at or above the theoretical minimum, Cu was removed to less than 1 ppm.

TABLE 4

|  | Untreated Solution (Blank) | NALMET® 8702 | | | |
|---|---|---|---|---|---|
|  |  | 100 ppm | 300 ppm | 500 ppm | 700 ppm |
| Average Flux | 117.1 | 207.5 | 380.6 | 471.1 | 432.0 |
| Max Cu in Permeate | 1.92 | 2.56 | 0.02 | 0.00 | 0.06 |

Example 7

The poly(DAADTC) product prepared above in Example 1 was tested under standard conditions (1000 ppm $SiO_2$; 10 ppm Cu; pH=7) at various dosages. As shown below in Table 5, at dosages ranging from 300 to 600 ppm, flux enhancement was seen relative to an untreated solution. Final copper concentrations were less than 0.1 ppm in all cases.

TABLE 5

|  | Untreated | 600 ppm | 400 ppm | 300 ppm |
|---|---|---|---|---|
| Average Flux | 144 | 521.5 | 505.9 | 422.3 |
| Max. Cu in Permeate | 2.4 | 0.01 | 0.04 | na* |

*not available

Example 8

NALMET® 8702 was tested for flux enhancement and Cu removal in solutions containing alternate abrasive solids. The solids tested were an alumina slurry (MSW 1500—available from Rodel, Inc. of Newark, Del.) and a filmed silica slurry (Semi-Sperse 12—available from Cabot Corporation of Boston, Mass.) The tests were done at 1000 ppm solids and 10 ppm Cu. In addition, the alumina slurry was pretreated with 600–800 ppm of bisulfite to remove excess oxidants present in the slurry. The polymer was dosed at 200 ppm in all cases. As shown below in Tables 6 and 7, good flux enhancement was seen relative to the untreated (blank) solutions. During the experiment, Cu concentration in permeate was less than 1 ppm (alumina slurry) and less than 0.1 ppm (fumed silica slurry).

TABLE 6

| Alumina | | 200 ppm NALMET® 8702 | |
|---|---|---|---|
|  | Untreated | plus 600 ppm bisulfite | plus 800 ppm bisulfite |
| Average Flux | 134 | 497.4 | 498.2 |
| Max. Cu in Permeate | 3.77–6.04 | 0.89–1.41* | na |

*1.41 ppm Cu was seen in the first sample. All samples thereafter contained < 1 ppm Cu.

TABLE 7

| | 1000 ppm Fumed Silica | |
|---|---|---|
|  | Untreated | 200 ppm NALMET® 8702 |
| Average Flux | 181.4 | 483.2 |
| Max. Cu in Permeate | 3.12 | 0.1 |

Example 9

A test solution containing 2000 ppm fumed silica solids and 10 ppm Cu was treated with NALMET® 8702 at dosages of 200 and 400 ppm. Relative to untreated fumed silica slurries, the addition of 200 ppm of treatment produced a flux enhancement, as shown in Table 8. A higher dosage of NALMET® 8702 did not further enhance the flux. Cu concentration in the permeate samples was below the detection limit.

TABLE 8

|  | 2000 ppm Fumed Silica | | |
|---|---|---|---|
|  | Untreated* | 200 ppm NALMET ® 8702 | 400 ppm NALMET ® 8702 |
| Average Flux | 181.4 | 347.3 | 338.6 |
| Max. Cu in Permeate | 3.12 | 0.06 | non-detectable |

*Untreated data is for solutions containing 1000 ppm of fumed silica solids. 2000 ppm of fumed silica solids is expected to show performance which is the same or worse than 1000 ppm.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A dithiocarbamate compound of the formula:

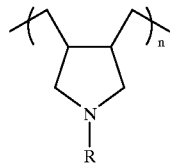

wherein R is H or $CS^-_2X^+$ and $X^+$ is an alkali metal, an alkaline earth metal or ammonium, and n is the number of repeating units such that the compound has a total molecular weight in the range of from about 3000 to about 100,000.

2. The compound of claim 1 wherein at least about 5% of R is $CS^-_2X^+$.

3. The compound of claim 1 wherein about 20 to about 70% of R is $CS^-_2 X^+$.

* * * * *